US007564601B2

(12) United States Patent
Angal et al.

(10) Patent No.: US 7,564,601 B2
(45) Date of Patent: Jul. 21, 2009

(54) METHOD FOR GENERATING A TONAL RESPONSE CURVE FOR A SCANNER

(75) Inventors: Aditya Jayant Angal, Lexington, KY (US); James Lesesne Bush, III, Lexington, KY (US); William Everett Gardner, Louisville, KY (US)

(73) Assignee: Lexmark International, Inc., Lexington, KY (US)

( * ) Notice: Subject to any disclaimer, the term of this patent is extended or adjusted under 35 U.S.C. 154(b) by 455 days.

(21) Appl. No.: 11/550,537

(22) Filed: Oct. 18, 2006

(65) Prior Publication Data

US 2008/0144136 A1    Jun. 19, 2008

(51) Int. Cl.
*H04N 1/46* (2006.01)
*H04N 1/00* (2006.01)
*H04N 1/40* (2006.01)
*H04N 1/04* (2006.01)

(52) U.S. Cl. .................. 358/504; 358/406; 358/461; 358/475; 358/509

(58) Field of Classification Search .......... None
See application file for complete search history.

(56) References Cited

U.S. PATENT DOCUMENTS

| | | | | |
|---|---|---|---|---|
| 5,321,525 A | * | 6/1994 | Hains | 358/3.01 |
| 5,371,616 A | * | 12/1994 | Numakura et al. | 358/534 |
| 6,466,337 B1 | * | 10/2002 | Suhr et al. | 358/446 |
| 7,099,047 B2 | * | 8/2006 | Konagaya | 358/3.26 |
| 7,236,270 B2 | * | 6/2007 | Okamura | 358/406 |
| 7,388,690 B2 | * | 6/2008 | Thakur | 358/406 |
| 2004/0125118 A1 | * | 7/2004 | Raunkjær et al. | 345/700 |
| 2005/0185837 A1 | * | 8/2005 | Takano et al. | 382/162 |
| 2006/0268353 A1 | * | 11/2006 | Thakur | 358/406 |
| 2007/0048638 A1 | * | 3/2007 | Wu et al. | 430/59.1 |

OTHER PUBLICATIONS

Gonzalez, Woods. Digital Image Processing Second Edition. Upper Saddle River, NJ: Prentice Hall, 2002. ISBN 0-201-18705-8, p. 38.
Horenstein. Microelectronic Circuits and Devices Second Edition. Englewood Cliffs, NJ: Prentice Hall, 1996. ISBN 0-13-701335-3.

* cited by examiner

*Primary Examiner*—Twyler L Haskins
*Assistant Examiner*—Barbara D Reinier
(74) *Attorney, Agent, or Firm*—Taylor & Aust, PC

(57) ABSTRACT

A method for generating a tonal response curve for a scanner includes (a) directing light from the scanner to a calibration target having a single uniform neutral tone; (b) measuring with the scanner an amount of incident light reflected from the calibration target to obtain a simulated optical density value associated with the calibration target and the amount of incident light; (c) changing the amount of the incident light; (d) repeating acts (b) and (c) until a predetermined number of simulated optical density values are accumulated; and (e) generating the tonal response curve for the scanner by matching each of the simulated optical density values with one of a plurality of reference optical densities.

20 Claims, 5 Drawing Sheets

METHOD FOR GENERATING A TONAL RESPONSE CURVE FOR A SCANNER

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Invention

The present invention relates generally to scanners and scanning methods, and more particularly to a method for generating a tonal response curve for a scanner.

2. Description of the Related Art

The way light is perceived by the human eye is very different from the way it is perceived by an image sensor, such as a photodiode, used in a scanner. Thus, in order to obtain an accurate facsimile of an original image from an image sensor, such as those used in scanners, multifunction printers, digital cameras, etc., the data captured by the sensor must be processed so that to human observation the original image and digital copy look the same.

It has been shown through experimental evidence that subjective brightness (intensity as perceived by the human visual system) is a logarithmic function of the light intensity incident on the eye. See, Gonzalez, Woods. *Digital Image Processing Second Edition*. Upper Saddle River, N.J.: Prentice Hall, 2002. Thus, in order to perceive a doubling in light intensity, the actual light incident on the eye must be increased exponentially. This is in stark contrast to the response of a photodiode which can be described by the equation ip=R×Popt, where ip is the reverse diode current induced by the incident light, R is the responsivity (measured in mA/mW), and Popt is the total light flux incident on the photodiode (measured in mW). Horenstein. *Microelectronic Circuits and Devices Second Edition*. Englewood Cliffs, N.J.: Prentice Hall, 1996. As is evident from the equation, in order to double the amount of current, the amount of incident light on the photodiode needs also only to be doubled.

Optical density is the base 10 Log of opacity, which is simply the ratio of incident light to transmitted light. Since the optical density scale is logarithmic, the human eye perceives it as linear. However, the image sensor is only sensitive to total incident light, so the output of the image sensor need to be corrected to make the image appear consistent with the original to human perception.

This correction may be achieved via a tonal response curve. The tonal response curve is determined before any image capture is performed in order to produce a good quality digital copy of the original image. Currently, this is manually done with a subset of machines which each utilize the same type of image sensor and several uniformly neutral target images with known optical properties. This one tonal response curve is then applied to every machine utilizing that image sensor type.

For example, a current process for determining a tonal response curve involves using a grayscale as the original image. The grayscale image is scanned with the image sensor and data from the image sensor is collected. The collected data is then compared to the known optical densities of the grayscale image. Thereafter, a tonal response curve is constructed based on the collected data and the comparison.

This process is carried out on a subset of machines which all use the same image sensor type, and the resulting tonal response curve (which will be averaged across the subset) is then applied to every machine that uses that image sensor. In other words, every machine having the same image sensor type has the same tonal response curve. What this means, of course, is that variations from machine to machine are not accounted for. Thus, it is not only possible, but probable that images from one machine will not look the same as images from another, and that either or both may not look like the original to a human observer.

SUMMARY OF THE INVENTION

The invention, in one form thereof, is directed to a method for generating a tonal response curve for a scanner. The method includes (a) directing light from the scanner to a calibration target having a single uniform neutral tone; (b) measuring with the scanner an amount of incident light reflected from the calibration target to obtain a simulated optical density value associated with the calibration target and the amount of incident light; (c) changing the amount of the incident light; (d) repeating acts (b) and (c) until a predetermined number of simulated optical density values are accumulated; and (e) generating the tonal response curve for the scanner by matching each of the simulated optical density values with one of a plurality of reference optical densities.

The invention, in another form thereof, is directed to a method for generating a tonal response curve for use with a device having a light source directing light at a target and having an image sensor for receiving light reflected from the target. The method includes (a) directing light from the light source to a calibration target having a single uniform neutral tone; (b) measuring with the image sensor an amount of incident light reflected from the calibration target to obtain a simulated optical density value associated with the calibration target and the amount of incident light; (c) changing the amount of the incident light; (d) repeating acts (b) and (c) until a predetermined number of simulated optical density values are accumulated; and (e) generating the tonal response curve for the image sensor by matching each of the simulated optical density values with one of a plurality of reference optical densities.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
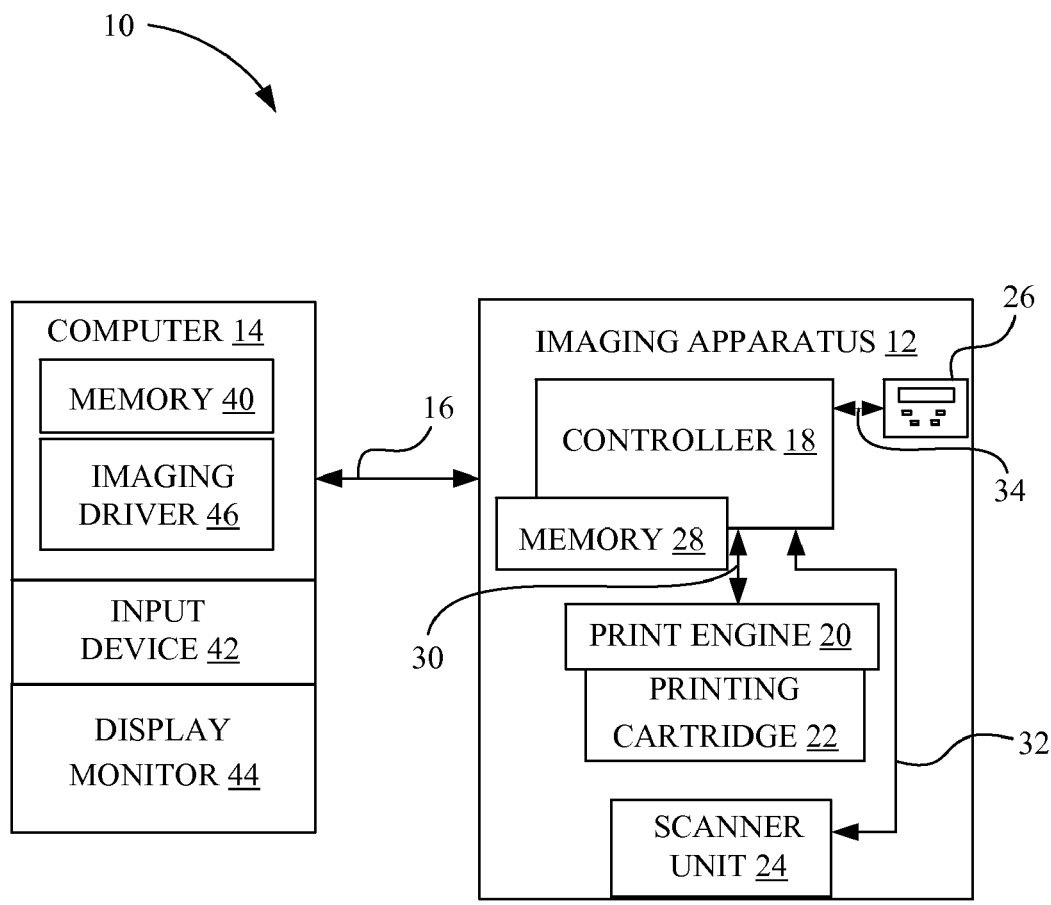
FIG. 1 is a diagrammatic depiction of an imaging system embodying the present invention.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the invention and other alternative mechanical configurations are possible.

Referring now to the drawings and particularly to FIG. 1, there is shown a diagrammatic depiction of an imaging system 10 embodying the present invention. As shown, imaging system 10 may include an imaging apparatus 12 and a computer 14. Imaging apparatus 12 communicates with computer 14 via a communications link 16. As used herein, the term "communications link" is used to generally refer to structure that facilitates electronic communication between multiple components, and may operate using wired or wireless technology. Imaging system 10 may be, for example, a development tool used in imaging apparatus design. Alternatively, imaging system 10 may represent a customer imaging system.

In the embodiment shown in FIG. 1, imaging apparatus 12 is shown as a multifunction machine that includes a controller 18, a print engine 20, a printing cartridge 22, a scanner 24, and a user interface 26. Imaging apparatus 12 may communicate with computer 14 via a standard communication protocol, such as for example, universal serial bus (USB), Ethernet or IEEE 802.1x. A multifunction machine is also sometimes referred to in the art as an all-in-one (AIO) unit. Those skilled in the art will recognize that imaging apparatus 12 may be, for example, an ink jet printer/copier; an electrophotographic printer/copier; a thermal transfer printer/copier, or other mechanism including at least scanner 24.

Controller 18 includes a processor unit and associated memory 28, and may be formed as one or more Application Specific Integrated Circuits (ASIC). Memory 28 may be, for example, random access memory (RAM), read only memory (ROM), and/or non-volatile RAM (NVRAM). Alternatively, memory 28 may be in the form of a separate electronic memory (e.g., RAM, ROM, and/or NVRAM), a hard drive, a CD or DVD drive, or any memory device convenient for use with controller 18. Controller 18 may be, for example, a combined printer and scanner controller. In the present embodiment, controller 18 communicates with print engine 20 via a communications link 30. Controller 18 communicates with scanner 24 via a communications link 32. User interface 26 is communicatively coupled to controller 18 via a communications link 34. Controller 18 serves to process print data and to operate print engine 20 during printing, as well as to operate scanner 24 and process data obtained via scanner 24. In addition, controller 18 may operate scanner 24 in accordance with the present invention to generate a tonal response curve associated with scanner 24.

Computer 14, which may be optional, may be, for example, a personal computer, including memory 40, such as RAM, ROM, and/or NVRAM, an input device 42, such as a keyboard, and a display monitor 44. Computer 14 further includes a processor, input/output (I/O) interfaces, and may include at least one mass data storage device, such as a hard drive, a CD-ROM and/or a DVD unit.

Computer 14 includes in its memory a software program including program instructions that function as an imaging driver 46, e.g., printer/scanner driver software, for imaging apparatus 12. Imaging driver 46 is in communication with controller 18 of imaging apparatus 12 via communications link 16. Imaging driver 46 facilitates communication between imaging apparatus 12 and computer 14. One aspect of imaging driver 46 may be, for example, to provide formatted print data to imaging apparatus 12, and more particularly, to print engine 20, to print an image. Another aspect of imaging driver 46 may be, for example, to facilitate collection of scanned data. Still another aspect of imaging driver 46 may be, for example, to facilitate calibration of print engine 20 and/or scanner 24.

In some circumstances, it may be desirable to operate imaging apparatus 12 in a standalone mode. In the standalone mode, imaging apparatus 12 is capable of functioning without computer 14. Accordingly, all or a portion of imaging driver 46, or a similar driver, may be located in controller 18 of imaging apparatus 12 so as to accommodate printing and scanning functionality when operating in the standalone mode.

Figure 2:
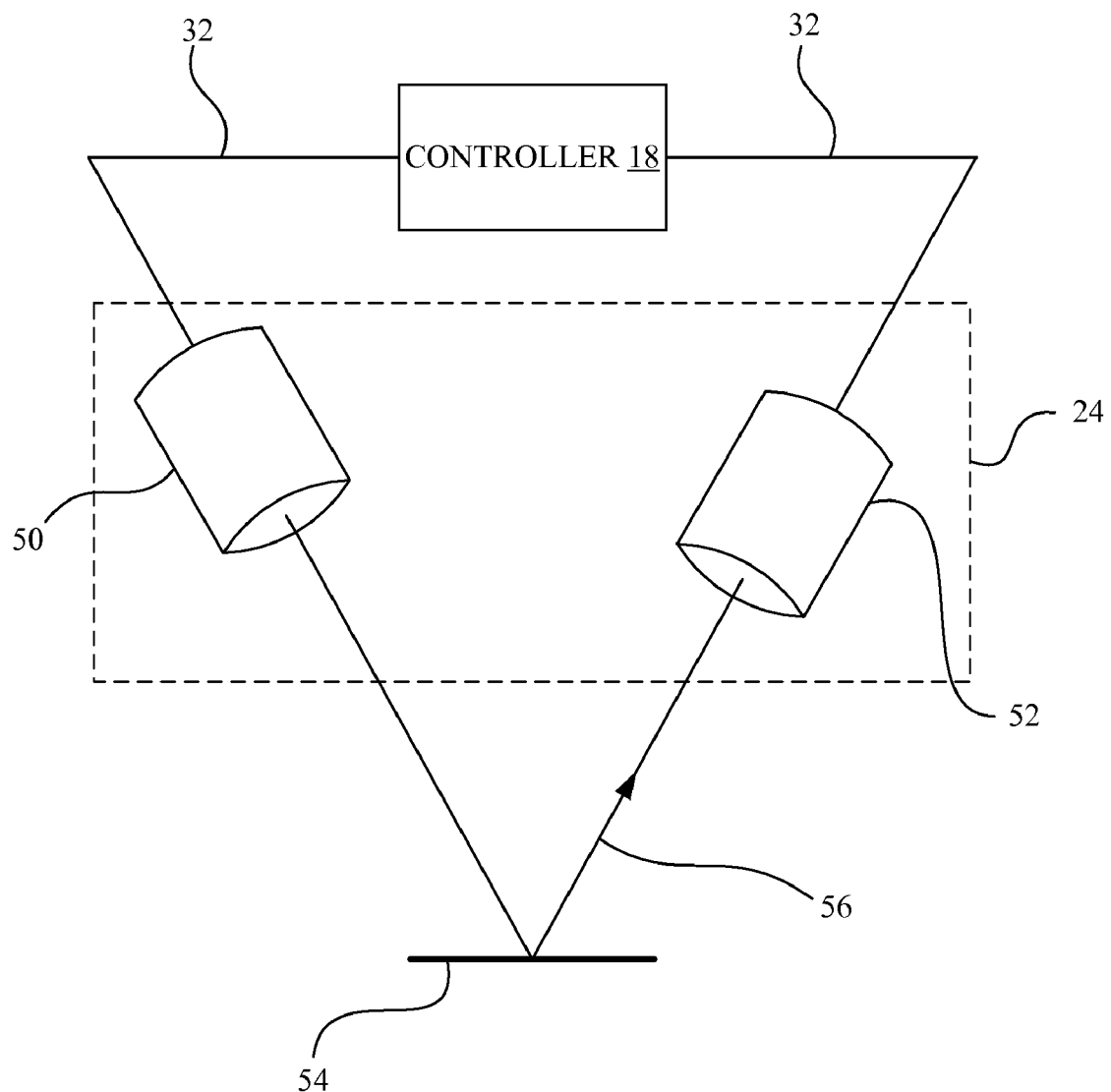
FIG. 2 is a diagrammatic depiction of the scanner in the imaging apparatus of FIG. 1.

Referring to FIG. 2, scanner 24 includes a light source 50 and an image sensor 52, e.g., a scan bar. Those skilled in the art will recognize that scanner 24 may include other signal processing and/or generation circuitry not shown in FIG. 2. Scanner 24 may be of a conventional scanner type, such as for example, a sheet feed or flat bed scanner. In the context of the present invention, either scanner type may be used. As is known in the art, a sheet feed scanner transports a document to be scanned past a stationary sensor device, whereas a flatbed scanner transports a movable scan bar (i.e., sensor device) over a stationary document.

Light source 50 may be, for example, a florescent bulb, or one or more light emitting diodes (LEDs). Image sensor 52 may be, for example, an optical reduction module or a Contact Image Sensors (CIS) array.

The optical reduction module is a collection of tiny, light-sensitive diodes, which convert photons into electrons. These diodes are called photosites, or photodiodes. The more photons that are captured by a single photosite, the greater the electrical charge that will accumulate at that site. The image of the document that is scanned using light source 50 reaches the optical reduction module through a series of mirrors, filters and lenses. The exact configuration of these components will depend on the model of scanner. Most optical reduction scanners use a single pass method, wherein the lens focuses the image onto three color filtered sensors. The scanner software assembles the three filtered images into a single full-color image.

In the CIS array, both light source 50 and image sensor 52 are included in a scan bar, which is typically used for example in inexpensive flatbed scanners. The CIS array includes an array of red, green and blue light emitting diodes (LEDs) and a corresponding array of phototransistors, or photodiodes. The image sensor array consisting of 600, 1200, 2400 or 4800 LEDs and phototransistors, or photodiodes, per inch (depending on resolution) spans the width of the scan area and is placed very close to the glass plate upon which rest the image to be scanned. Another version of the CIS uses a single set of red, green and blue LEDS in combination with light pipes to provide illumination of the material to be scanned. When the image is scanned, the LEDs combine to provide a white light source. The illuminated image is then captured by the row of sensors. CIS scanners are cheaper, lighter and thinner, but may not provide the same level of quality and resolution found in most optical reduction scanners. Color scanning is done by illuminating each color type of LED separately and then combining the three scans.

Figure 3:
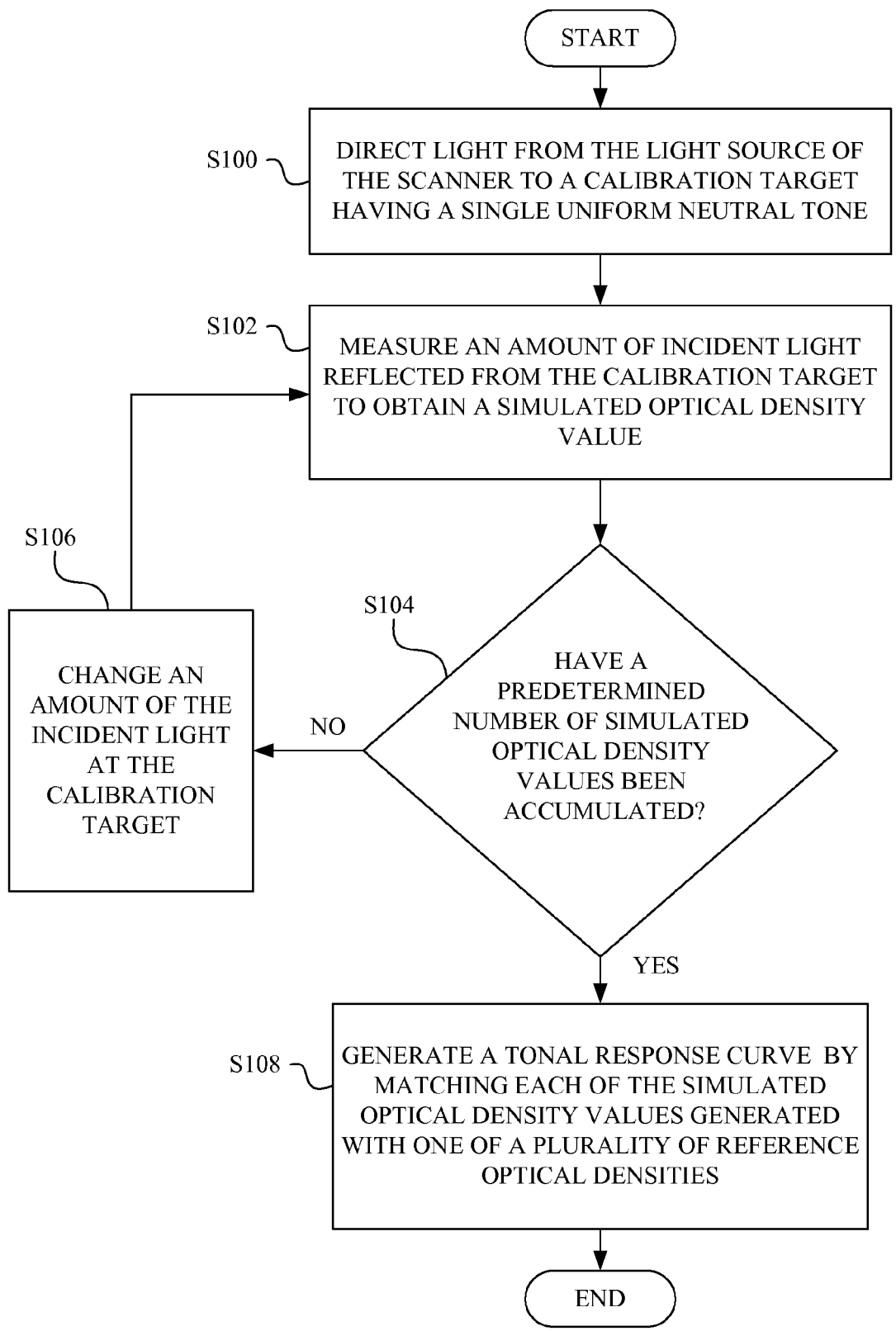
FIG. 3 is a flowchart of a method for generating a tonal response curve for the scanner of FIG. 2, in accordance with an embodiment of the present invention.

FIG. 3 is a flowchart of a method for generating a tonal response curve for a scanner, such as scanner 24, and in particular image sensor 52 of scanner 24, in accordance with an embodiment of the present invention.

At act S100, and referring also to FIG. 2, light is directed from light source 50 of scanner 24 to a calibration target 54 having a single uniform neutral tone (uniform optical density). The uniform neutral tone of calibration target 54 may be, for example, described as luminance $L^* > TL$ and chrominance $a^* \& b^* < Tab$ as defined in CIELAB color space, where TL and Tab are predetermined thresholds. In the CIELAB color space system, which is device-independent, $L^*$ is a luminance (lightness) component, and $a^*$ and $b^*$ are chrominance components. Calibration target 54 may be, for example, in the form of a calibration media sheet, or may be formed at a permanent location in the scan path of scanner 24 in imaging apparatus 12.

At act S102, image sensor 52 of scanner 24 measures an amount of incident light 56 reflected from calibration target 54 to obtain a simulated optical density value associated with calibration target 54 and the amount of incident light 56. Each simulated optical density value may be stored, for example, in memory 28 of imaging apparatus 12, or in memory 40 of computer 14.

For example, optical density $OD = \text{Log } 10 \ (l_i/l_t)$, where $l_i$ is the amount of incident light 56, and $l_t$ is the amount of transmitted light. However, in the present invention, the term $l_t$ associated with calibration target 54 does not change, i.e., $l_t$ becomes a constant. Thus, a grayscale can be simulated by scanning the same calibration target 54, having a single uniform neutral tone (i.e., a uniform optical density), multiple times and varying the amount of incident light used for each of the scans.

At act S104, it is determined whether a predetermined number of simulated optical density values, i.e., simulated optical densities, have been accumulated. If the determination at act S104 is NO, then the process proceeds to act S106.

At act S106, the amount of the incident light 56 at calibration target 54 is changed, and the process returns to act S102. The amount of incident light may be changed, for example, by changing a light intensity of the light directed from light source 50 to calibration target 54.

The predetermined number of simulated optical density values referenced at act S104 may be any number, but in general, the higher the number of simulated optical density values that are obtained, the better the quality and accuracy of the tonal response curve for image sensor 52 of scanner 24. If, for example, the predetermined number is 100, then acts S102 and S106 will be repeated until a total of 100 simulated optical density values are recorded.

If the determination at act S104 is YES, then the process proceeds to act S108.

Figure 4:
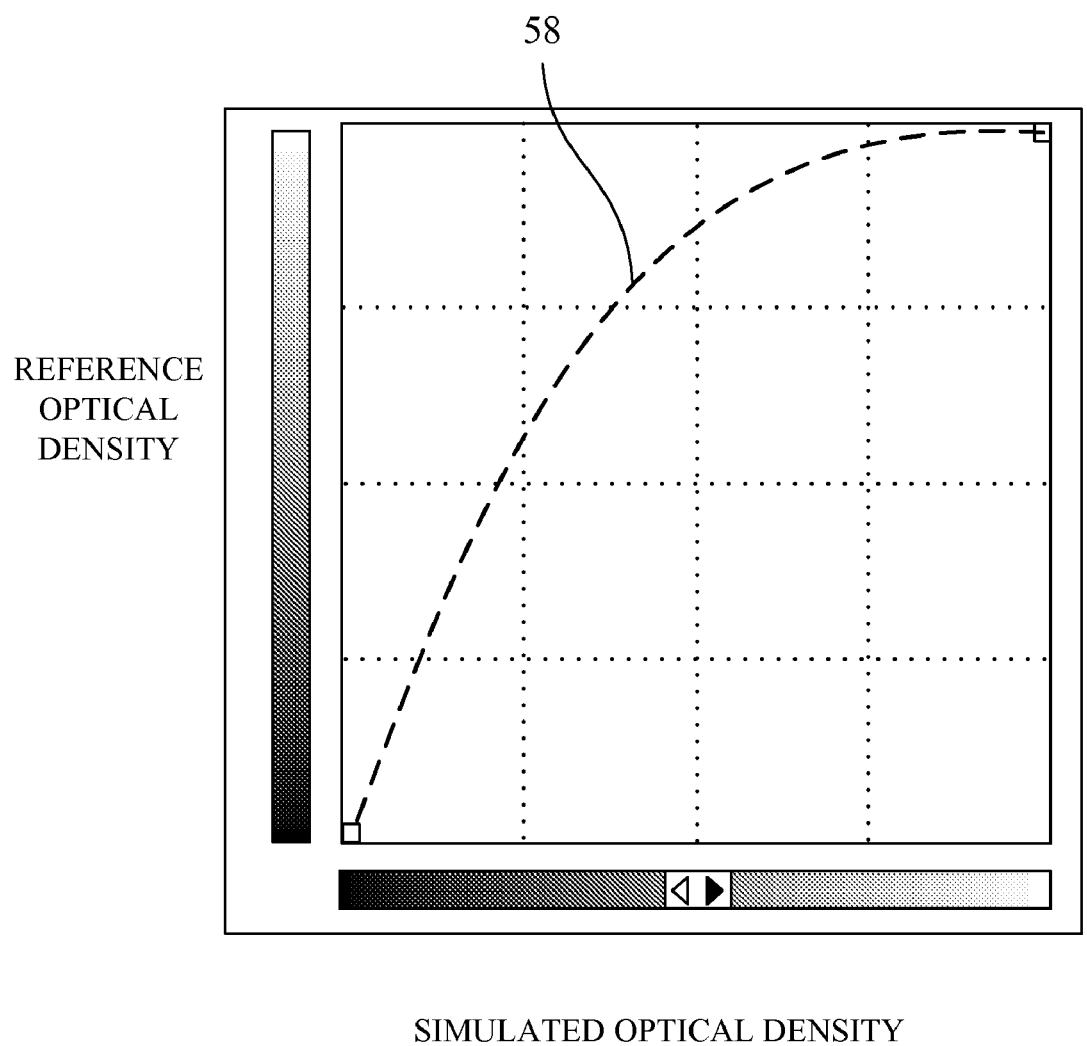
FIG. 4 is a graphical depiction of a tonal response curve generated in accordance with an embodiment of the present invention.

At act S108, referring to FIG. 4, a tonal response curve 58 for image sensor 52 of scanner 24 is generated by matching each of the simulated optical density values generated at act S102, i.e., simulated optical densities, with one of a plurality of reference optical densities. The plurality of reference optical densities may be stored in a lookup table, such as in memory 28 or memory 40.

Figure 5:
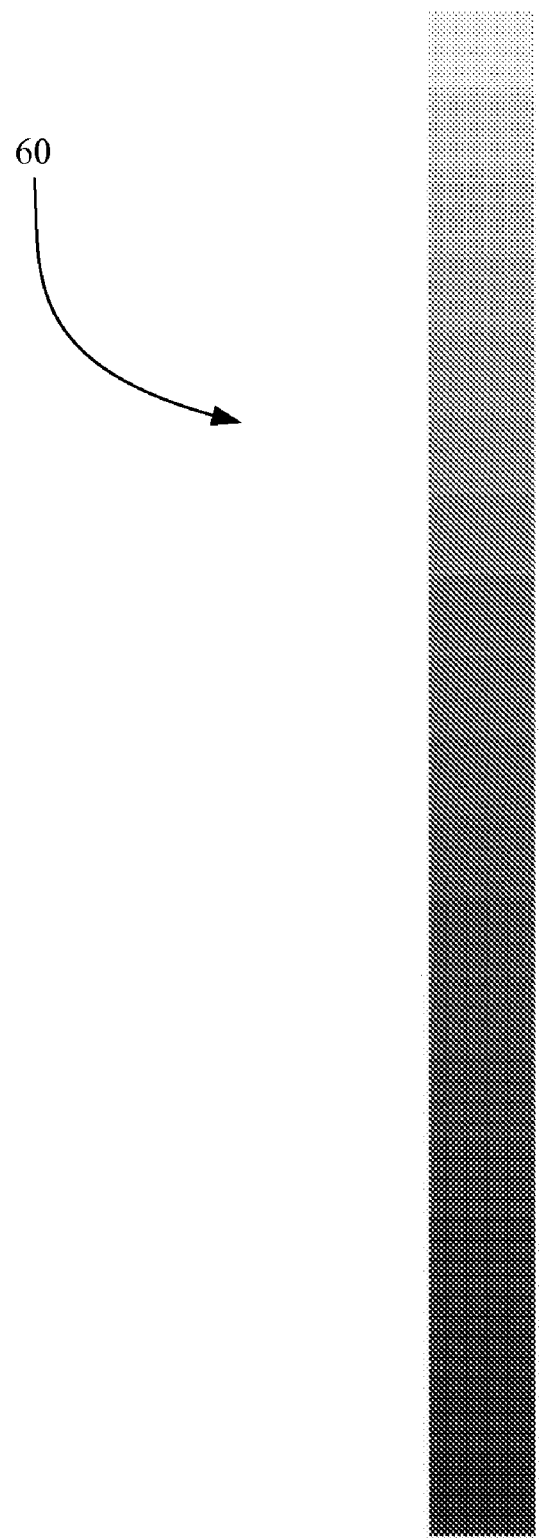
FIG. 5 is a diagrammatic depiction of a grayscale having a plurality of reference targets.

Referring to FIG. 5, the plurality of reference optical densities may be generated, for example, by scanning with scanner 24 a plurality of reference targets 60 having known optical densities (usually uniform and neutral, as a grayscale) to generate the plurality of reference optical densities. As illustrated in FIG. 5, the plurality of reference targets 60 may be, for example, in the form of a grayscale strip having a plurality of patches, with each patch having a unique reference optical density. The color space coordinates of the targets 60 are known with respect to the final output color space of scanner 24. The responses of scanner 24 to the reference targets 60 (a set of color space coordinates) are compared with their desired, i.e., known, color space coordinates. The mapping is then formed to "adjust" the response of scanner 24 from where it was to where it is desired to be.

Assume, by way of example, that the color space is sRGB (red, green blue), and the coordinates of a particular patch of reference targets 60 are (128, 128, 128). Also assume that the response of scanner 24 in scanning this patch is (77, 91, 91). Therefore, the process maps from 77 to 128 in the red channel, 91 to 128 in the green channel, and 91 to 128 in the blue channel. This is just one point for use in the actual tonal response curve, so the process is repeated for each of the patches of the plurality of target patches 60 with similar adjustments being made as needed.

The method for generating a tonal response curve described above may be repeated throughout a lifecycle of the device, e.g., imaging apparatus 12, to automatically calibrate tonal response curve 58 so as to compensate for any degradation of scanner 24 over time.

However, it is noteworthy that the establishment of the plurality of simulated optical density values, e.g., forming a simulated grayscale, may be done only once and recorded, e.g., stored in memory, if desired. For example, light intensity levels associated with the plurality of simulated optical density values may be stored in memory 28 of imaging apparatus 12, in memory 40 of computer 14, or other memory. Likewise, the establishment of the plurality of reference optical densities may be done only once and recorded, e.g., stored in memory, if desired. For example, light intensity levels associated with the plurality of reference optical densities values may be stored in memory 28 of imaging apparatus 12, in memory 40 of computer 14, or other memory.

After these establishments have been accomplished, the recorded information, e.g., light intensity levels, associated with the plurality of simulated optical density values and the plurality of reference optical densities values may be applied to that same device (e.g., scanner, or multifunction machine), as in performing a recalibration of the original tonal response curve. Or, alternatively, the recorded information may be applied to a different device (e.g., a different scanner, or different multifunction machine) utilizing the same type of image sensor type to generate another tonal response curve for that different device. In other words, once this "matching" is done, the simulated optical density values, i.e., light intensity levels, may be used on any machine using the same sensor type, if desired, so they too can simulate the grayscale and then consequently create their own mappings from observed response to ideal response. And from this point on, the use of the plurality of reference targets 60 may be avoided, if desired. In other words, the plurality of reference targets 60 are required only once, and on only one machine, during the development of the "matching" of the simulated optical density values, i.e., light levels, to the physical reference targets 60.

Two reasons why this is possible are: first, the normal image sensor calibration typically includes a calibration of the light source, and second, the optical power output of the LED (e.g., light source 50) is linear and can be described by the equation Popt=ExiD, where Popt is the optical power output (measured in mW), E is the emissivity (measured in mW/mA), and iD is the forward-bias current of the LED. The term calibration, as used immediately above, means that at least two points of response by scanner 24 to light power output and the calibration target are fixed in the final output color space of scanner 24.

Thus, detrimental issues inherent in prior tonal response curve determination processes are addressed through a method by which each machine, e.g., imaging apparatus 12, may automatically create a tonal response curve for its specific grayscale response. That is, each machine may automatically create its own unique tonal response curve. In addition, the tonal response curve generated by the method of the present invention facilitates the ability to increase the resolution of the tonal response curve over that of the prior tonal response curves through the accumulation of any desired number of simulated optical densities, thereby improving its accuracy.

The foregoing description of a method and an embodiment of the invention have been presented for purposes of illustration. It is not intended to be exhaustive or to limit the invention to the precise steps, acts and/or forms disclosed, and obviously many modifications and variations are possible in light of the above teaching. It is intended that the scope of the invention be defined by the claims appended hereto.

What is claimed is:

1. A method for generating a tonal response curve for a scanner, comprising:
   (a) directing light from said scanner to a calibration target having a single uniform neutral tone;
   (b) measuring with said scanner an amount of incident light reflected from said calibration target to obtain a simulated optical density value associated with said calibration target and said amount of incident light;
   (c) changing said amount of said incident light;
   (d) repeating acts (b) and (c) until a predetermined number of simulated optical density values are accumulated; and
   (e) generating said tonal response curve for said scanner by matching each of said simulated optical density values with one of a plurality of reference optical densities.

2. The method of claim 1 wherein said uniform neutral tone of said calibration target is any tone adhering to the equations luminance L*>TL and chrominance a*& b*<Tab as defined in CIELAB color space, where TL and Tab are predetermined thresholds.

3. The method of claim 1 wherein said changing said amount of said incident light is performed by changing a light intensity of said light output from said scanner.

4. The method of claim 1 wherein said scanner is incorporated into an imaging apparatus.

5. The method of claim 1, further comprising scanning with said scanner a plurality of reference targets to generate said plurality of reference optical densities.

6. The method of claim 5, further comprising storing in a memory first light intensity levels associated with said simulated optical density values and second light intensity levels associated with said plurality of reference optical densities.

7. The method of claim 6, further comprising recalibrating said tonal response curve throughout a lifecycle of a device in which said tonal response curve is used based on said first light intensity levels and said second light intensity levels stored in said memory.

8. The method of claim 1 wherein said scanner is one of a plurality of scanners of a first type of scanners, and further comprising:
   recording first light intensity levels used by said scanner in generating said simulated optical density values; and
   using said first light intensity levels in another scanner of said first type for generating another tonal response curve corresponding to said another scanner.

9. The method of claim 8, further comprising:
   recording second light intensity levels used by said scanner in generating said plurality of reference optical densities; and
   using said second recorded light intensity levels in said another scanner of said first type for generating said another tonal response curve corresponding to said another scanner.

10. The method of claim 1 wherein said method is repeated throughout a lifecycle of a device in which said tonal response curve is used to automatically calibrate said tonal response curve.

11. A method for generating a tonal response curve for use with a device having a light source directing light at a target and having an image sensor for receiving light reflected from said target, comprising:
    (a) directing light from said light source to a calibration target having a single uniform neutral tone;
    (b) measuring with said image sensor an amount of incident light reflected from said calibration target to obtain a simulated optical density value associated with said calibration target and said amount of incident light;
    (c) changing said amount of said incident light;
    (d) repeating acts (b) and (c) until a predetermined number of simulated optical density values are accumulated; and
    (e) generating said tonal response curve for said image sensor by matching each of said simulated optical density values with one of a plurality of reference optical densities.

12. The method of claim 11 wherein said uniform neutral tone of said calibration target is any tone adhering to the equations luminance L*>TL and chrominance a*& b*<Tab as defined in CIELAB color space, where TL and Tab are predetermined thresholds.

13. The method of claim 11 wherein said changing said amount of said incident light is performed by changing a light intensity of said light directed from said light source.

14. The method of claim 11 wherein said device is a multifunction machine.

15. The method of claim 11, further comprising scanning with said scanner a plurality of reference targets to generate said plurality of reference optical densities.

16. The method of claim 15, further comprising storing in a memory first light intensity levels associated with said simulated optical density values and second light intensity levels associated with said plurality of reference optical densities.

17. The method of claim 16, further comprising recalibrating said tonal response curve throughout a lifecycle of said device in which said tonal response curve is used based on said first light intensity levels and said second light intensity levels stored in said memory.

18. The method of claim 11 wherein said device is one of a plurality of devices of a first type, and further comprising:

recording first light intensity levels used by said device in generating said simulated optical density values; and using said first light intensity levels in another device of said first type for generating another tonal response curve corresponding to said another device.

19. The method of claim 18, further comprising:

recording second light intensity levels used by said device in generating said plurality of reference optical densities; and using said second recorded light intensity levels in said another device of said first type for generating said another tonal response curve corresponding to said another device.

20. The method of claim 11 wherein said method is repeated throughout a lifecycle of said device to automatically calibrate said tonal response curve.

\* \* \* \* \*